United States Patent
Saiwai et al.

(10) Patent No.: US 10,624,102 B2
(45) Date of Patent: *Apr. 14, 2020

(54) METHOD, BASE STATION, AND USER TERMINAL FOR USING LOCATION INFORMATION OF USER TERMINAL

(71) Applicant: KYOCERA CORPORATION, Kyoto (JP)

(72) Inventors: Takahiro Saiwai, Kawasaki (JP); Kugo Morita, Yokohama (JP); Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/165,793

(22) Filed: Oct. 19, 2018

(65) Prior Publication Data
US 2019/0059082 A1 Feb. 21, 2019

Related U.S. Application Data

(63) Continuation of application No. 14/903,794, filed as application No. PCT/JP2014/068136 on Jul. 8, 2014, now Pat. No. 10,142,992.

(30) Foreign Application Priority Data

Jul. 9, 2013 (JP) ................................ 2013-144025

(51) Int. Cl.
| | |
|---|---|
| *H04W 72/04* | (2009.01) |
| *H04W 8/00* | (2009.01) |
| *H04W 48/14* | (2009.01) |
| *H04W 92/18* | (2009.01) |
| *H04W 48/16* | (2009.01) |

(52) U.S. Cl.
CPC ......... *H04W 72/048* (2013.01); *H04W 8/005* (2013.01); *H04W 48/14* (2013.01); *H04W 48/16* (2013.01); *H04W 92/18* (2013.01)

(58) Field of Classification Search
CPC ... H04W 72/048; H04W 4/005; H04W 8/005; H04W 48/04; H04W 48/14; H04W 48/16; H04W 92/18; H04L 5/0069
See application file for complete search history.

(56) References Cited

U.S. PATENT DOCUMENTS

| | | |
|---|---|---|
| 2008/0069039 A1 | 3/2008 | Li et al. |
| 2010/0202400 A1 | 8/2010 | Richardson et al. |

(Continued)

FOREIGN PATENT DOCUMENTS

| | | |
|---|---|---|
| JP | 2012-090283 A | 5/2012 |
| JP | 2012-517784 A | 8/2012 |

(Continued)

OTHER PUBLICATIONS

3GPP TR 22.803, V12.1.0 (Mar. 2013), 3rd Generation Partnership Project; Technical Specification Group Services and System Aspects; Feasibility study for Proximity Services (ProSe), (Release 12), pp. 1-45.

(Continued)

*Primary Examiner* — Paul H Masur
(74) *Attorney, Agent, or Firm* — Studebaker & Brackett PC

(57) ABSTRACT

A base station allocates radio resources used for device-to-device D2D communication based on location information indicating a geographical location of a user terminal located in a cell of a base station. The base station notifies the allocated radio resources to the user terminal by a unicast manner, and the user terminal uses the allocated radio resources to transmit a signal for the D2D communication.

3 Claims, 13 Drawing Sheets

(56) References Cited

U.S. PATENT DOCUMENTS

| | | |
|---|---|---|
| 2011/0110322 A1 | 5/2011 | Koyanagi et al. |
| 2012/0182890 A1 | 7/2012 | Li et al. |
| 2013/0195026 A1 | 8/2013 | Johnsson et al. |
| 2014/0301326 A1 | 10/2014 | Patil et al. |
| 2016/0021676 A1 | 1/2016 | Yamazaki et al. |
| 2016/0165585 A1 | 6/2016 | Saiwai et al. |
| 2017/0006458 A1 | 1/2017 | Wang et al. |

FOREIGN PATENT DOCUMENTS

| | | |
|---|---|---|
| JP | 2013-529416 A | 7/2013 |
| JP | 2014-530521 A | 11/2014 |
| JP | 2015-019177 A | 1/2015 |
| WO | 2009154270 A1 | 12/2009 |
| WO | 2011/130630 A1 | 10/2011 |
| WO | 2012099829 A1 | 7/2012 |

OTHER PUBLICATIONS

Discussion about resource allocation schemes for D2D discovery, 3GPP TSG RAN WGI Meeting #73, R1-132211, Fukuoka, Japan, May 20-24, 2013, pp. 1-3.

International Search Report and Written Opinion of PCT/JP2014/068136 dated Oct. 14, 2014.

An Office Action issued by the Japanese Patent Office dated Mar. 6, 2018, which corresponds to Japanese Patent Application No. 2017-232396 and is related to U.S. Appl. No. 14/903,794; with English language concise explanation.

WHEN NUMBER OF UEs
IN CELL IS LARGE

WHEN NUMBER OF UEs
IN CELL IS SMALL

FIG. 11A
FIG. 11B
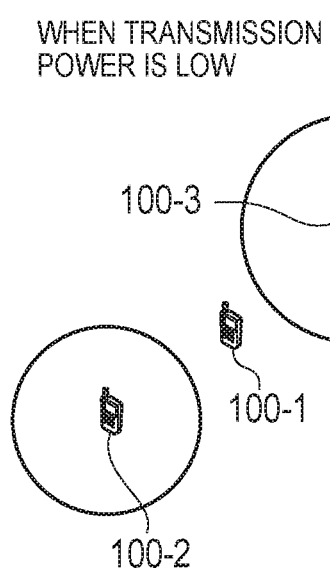
WHEN TRANSMISSION
POWER IS LOW
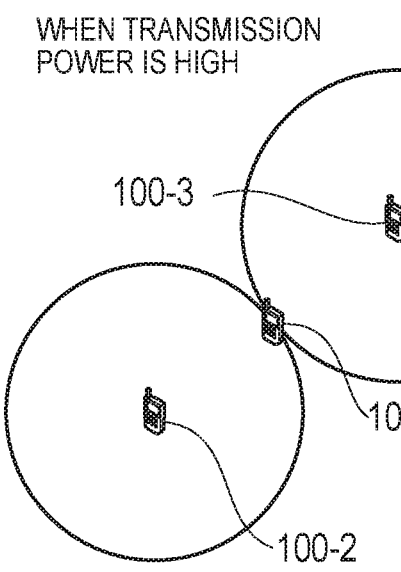
WHEN TRANSMISSION
POWER IS HIGH

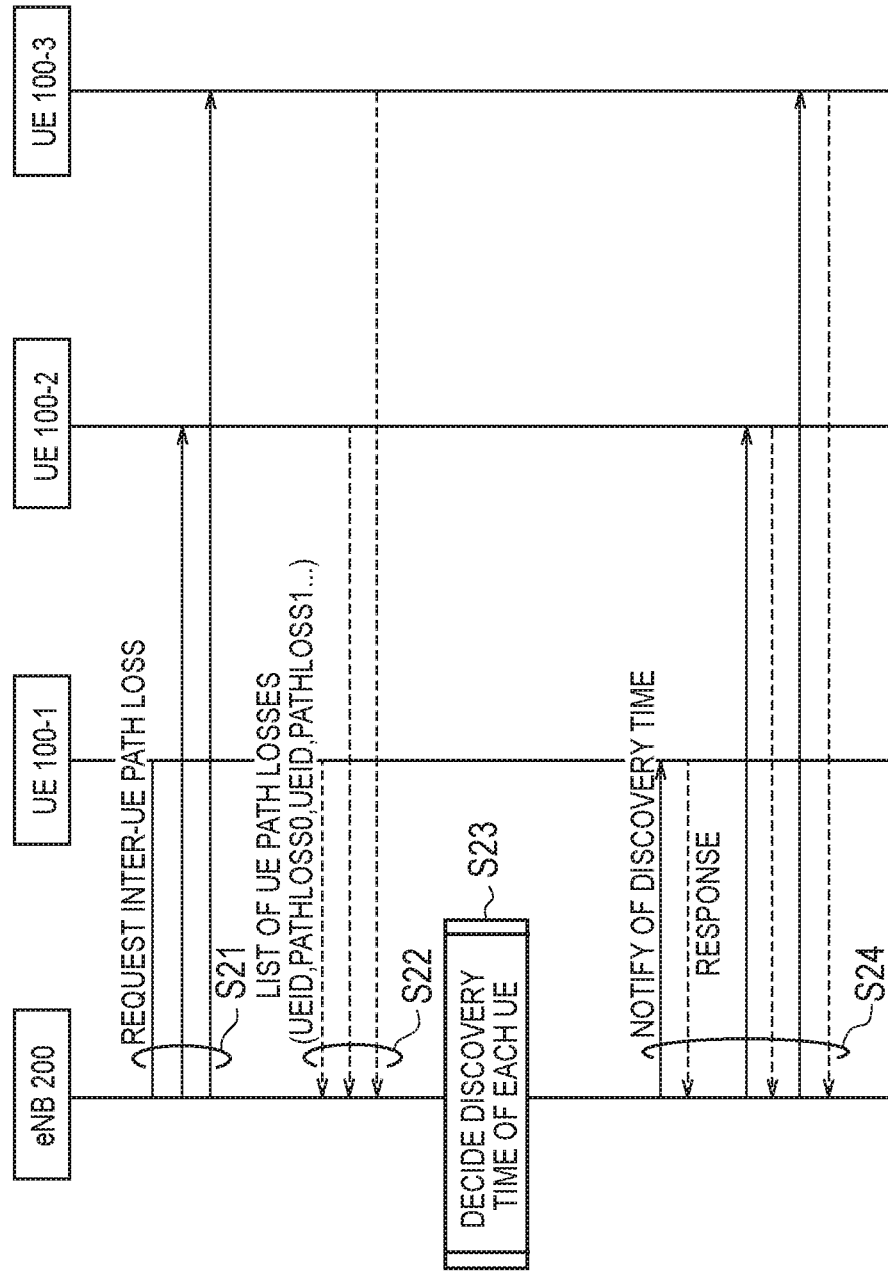

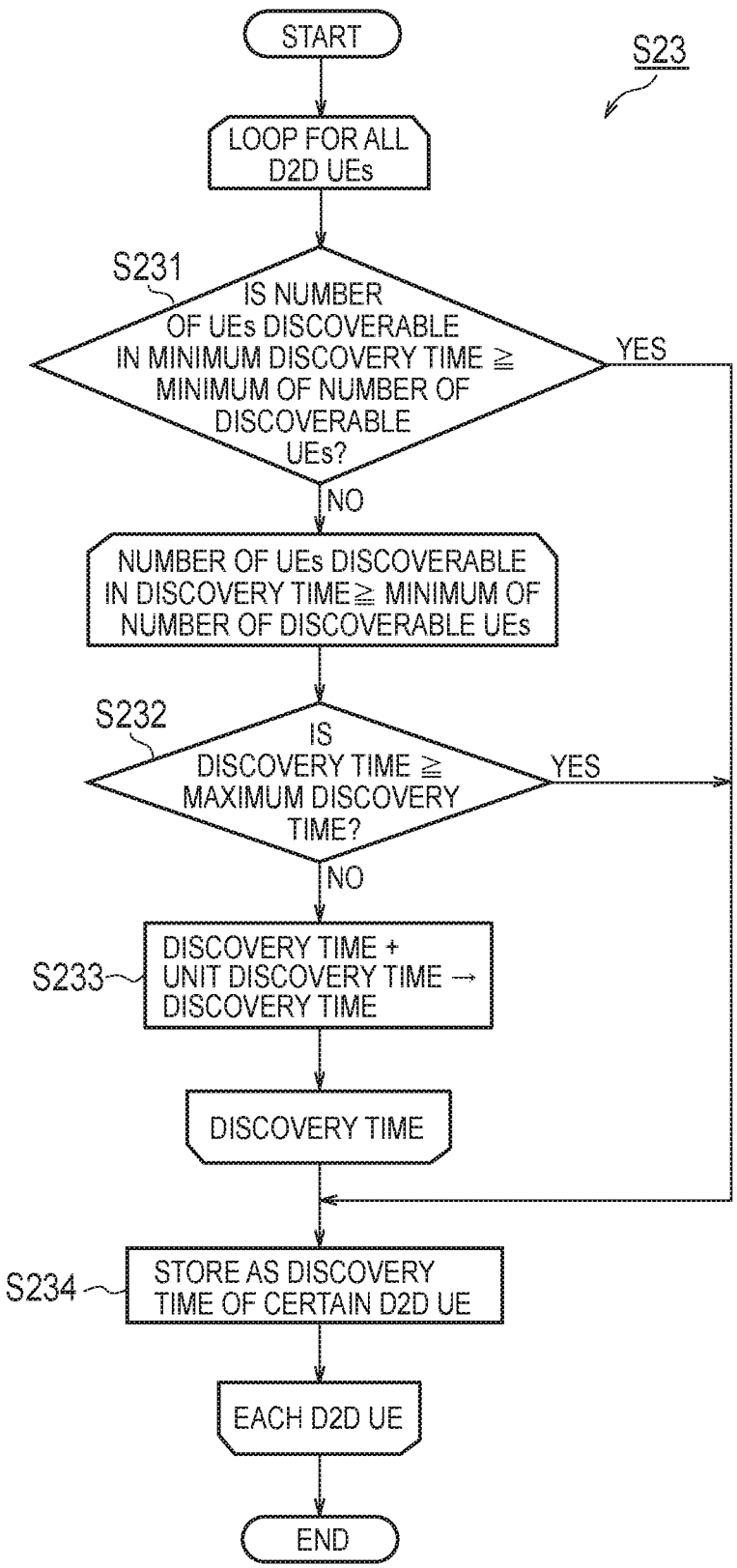

PREVIOUS TIME

CURRENT TIME

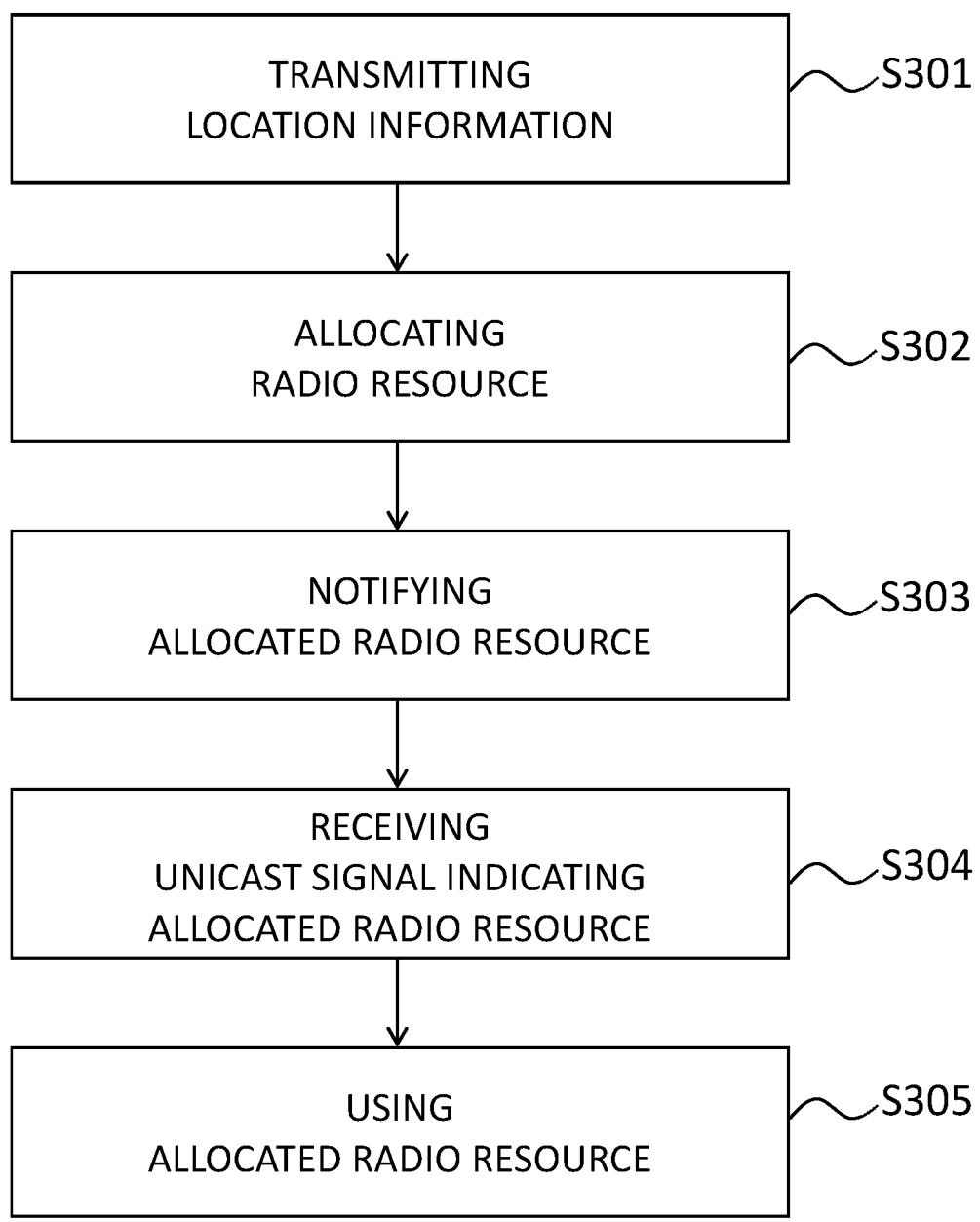

METHOD, BASE STATION, AND USER TERMINAL FOR USING LOCATION INFORMATION OF USER TERMINAL

CROSS-REFERENCE TO RELATED APPLICATIONS

This application is a Continuation of U.S. application Ser. No. 14/903,794 filed Jan. 8, 2016, which is the U.S. National Phase of International Application No. PCT/JP2014/068136 filed Jul. 8, 2014, which claims the benefit of Japanese Patent Application No. 2013-144025 filed Jul. 9, 2013, the entire contents of which are incorporated herein by reference.

TECHNICAL FIELD

The present disclosure relates to a network apparatus and a communication control method which are used in a mobile communication system that supports device-to-device (D2D) communication.

BACKGROUND ART

In the 3rd Generation Partnership Project (3GPP) that is a mobile communication system standardization project, introduction of device-to-device (D2D) communication into Release 12 as a new function is under consideration (see Non Patent Literature 1).

In the D2D communication, a plurality of nearby user terminals perform direct inter-terminal communication without passing through a network. On the other hand, in cellular communication that is normal communication of a mobile communication system, user terminals perform communication via a network.

The user terminal transmits and receives a discovery signal used for discovering a nearby user terminal in order to perform the D2D communication. After the discovery process, the user terminal performs the D2D communication with the nearby user terminal.

CITATION LIST

Non Patent Literature

Non Patent Literature 1: 3GPP Technical Report "TR 22.803 V12.1.0," March, 2013

SUMMARY

In the mobile communication system that supports the D2D communication, it is necessary to secure radio resources (hereinafter, "discovery resources") used for transmission and reception of the discovery signal, separately from radio resources (hereinafter, "D2D communication resources") used for transmission and reception of user data in the D2D communication.

However, when the discovery resources are secured, it is possible to increase a probability that the nearby user terminal will be discovered successfully, but there is a problem in that since the D2D communication resources or cellular communication resources are relatively reduced, a system throughput decreases.

In this regard, it is an object of the present disclosure to provide a network apparatus and a communication control method, which are capable of appropriately setting the discovery resources.

A method for a mobile communication system according to the present disclosure supports a device-to-device (D2D) communication that is direct inter-terminal communication. The method comprises transmitting location information indicating a geographical location of a user terminal located in a cell of a base station, from the user terminal to the base station, allocating, at the base station, radio resources to the user terminal based on the location information, where the radio resources are used by the user terminal to transmit a signal for the D2D communication, notifying the allocated radio resources to the user terminal by a unicast manner; receiving, at the user terminal, a unicast signal indicating the radio resources allocated by using the location information, from the base station; and using the allocated radio resources to transmit the signal for the D2D communication.

A base station for a mobile communication system according to the present disclosure supports a device-to-device (D2D) communication that is direct inter-terminal communication. The base station comprises a controller configured to acquire location information indicating geographical location of a user terminal located in a cell of the base station, from the user terminal, allocate radio resources to the user terminal based on the location information, where the radio resources are used by the user terminal to transmit a signal for the D2D communication, and notify the allocated radio resources to the user terminal by a unicast manner.

A user terminal for a mobile communication system according to the present disclosure supports a device-to-device (D2D) communication that is direct inter-terminal communication. The user terminal comprises a controller configured to transmit location information indicating a geographical location of the user terminal located in a cell of a base station, to the base station, receive a unicast signal indicating radio resources allocated by using the location information, from the base station, the unicast signal being specific to the user terminal, and use the allocated radio resources to transmit a signal for the D2D communication.

BRIEF DESCRIPTION OF DRAWINGS

FIGS. 11A and 11B are diagrams illustrating a second operation pattern according to an embodiment.

FIG. 12 is a sequence diagram illustrating a third operation pattern according to an embodiment.

FIG. 13 is a flowchart illustrating a flow of calculating a discovery time in the third operation pattern according to an embodiment.

FIG. 17 is another flowchart illustrating a flow of calculating a discovery time in the third operation pattern according to an embodiment.

DESCRIPTION OF EMBODIMENTS

Overview of Embodiments

A network apparatus according to embodiments is included in a network of a mobile communication system that supports device-to-device (D2D) communication that is direct inter-terminal communication. The network apparatus includes a controller configured to set discovery resources that are radio resources used for transmission or reception of a discovery signal for performing the D2D communication. The controller controls a quantity of the discovery resources based on information on a user terminal existing in a target area that is a setting target area of the discovery resources.

In the embodiments, the target area is a cell of the mobile communication system. The controller controls the quantity of the discovery resources set to the cell based on information on the user terminal existing in the cell.

In the embodiments, the information on the user terminal is information indicating number of user terminals existing in the target area.

In the embodiments, the information on the user terminal is information indicating a density of user terminals existing in the target area.

In the embodiments, the information on the user terminal is information indicating an attribute of the user terminal existing in the target area.

In the embodiments, the information on the user terminal is information indicating transmission power of the discovery signal in the user terminal existing in the target area.

In the embodiments, the information on the user terminal is information on a result of a discovery process using the discovery signal in the user terminal existing in the target area.

In the embodiments, the information on the user terminal is information indicating a size of the cell in which the user terminal exists.

A communication control method according to embodiments is used in a mobile communication system that supports device-to-device (D2D) communication that is direct inter-terminal communication. The communication control method includes a step of setting, by a network apparatus included in a network of the mobile communication system, discovery resources that are radio resources used for transmission or reception of a discovery signal for performing the D2D communication. In the step of the setting, the network apparatus controls a quantity of the discovery resources based on information on a user terminal existing in a target area that is a setting target area of the discovery resources.

Embodiment

Hereinafter, an embodiment in which the present disclosure is applied to an LTE system will be described.

(System Configuration)

Figure 1:
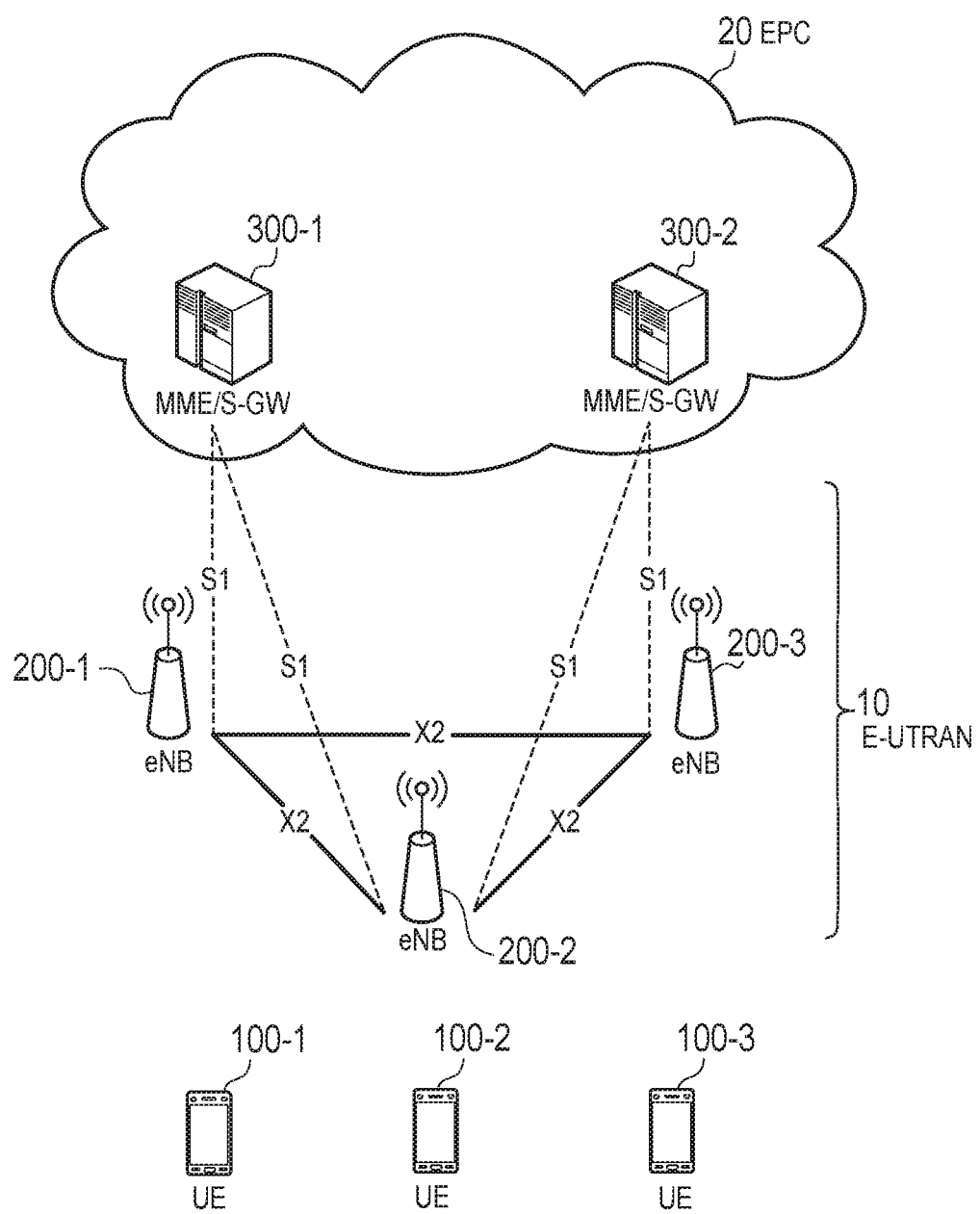
FIG. 1 is a configuration diagram illustrating an LTE system according to an embodiment.

FIG. 1 is a configuration diagram of an LTE system according to a first embodiment. As illustrated in FIG. 1, the LTE system includes a plurality of UEs (User Equipments) 100, E-UTRAN (Evolved-UMTS Terrestrial Radio Access Network) 10, and EPC (Evolved Packet Core) 20.

The UE 100 corresponds to a user terminal. The UE 100 is a mobile communication device and performs radio communication with a cell (a serving cell) with which a connection is established. Configuration of the UE 100 will be described later.

The E-UTRAN 10 corresponds to a radio access network. The E-UTRAN 10 includes a plurality of eNBs (evolved Node-Bs) 200. The eNB 200 corresponds to a base station. The eNBs200 are connected mutually via an X2 interface. Configuration of the eNB200 will be described later.

The eNB 200 manages one or a plurality of cells and performs radio communication with the UE 100 which establishes a connection with the cell of the eNB 200. The eNB 200 has a radio resource management (RRM) function, a routing function for user data, and a measurement control function for mobility control and scheduling, and the like. It is noted that the "cell" is used as a term indicating a minimum unit of a radio communication area, and is also used as a term indicating a function of performing radio communication with the UE 100.

The EPC 20 corresponds to a core network. The EPC 20 includes a plurality of MME (Mobility Management Entity)/S-GWs (Serving-Gateways) 300. The MME performs various mobility controls and the like for the UE 100. The S-GW performs control to transfer user. MME/S-GW 300 is connected to eNB 200 via an S1 interface.

Figure 2:
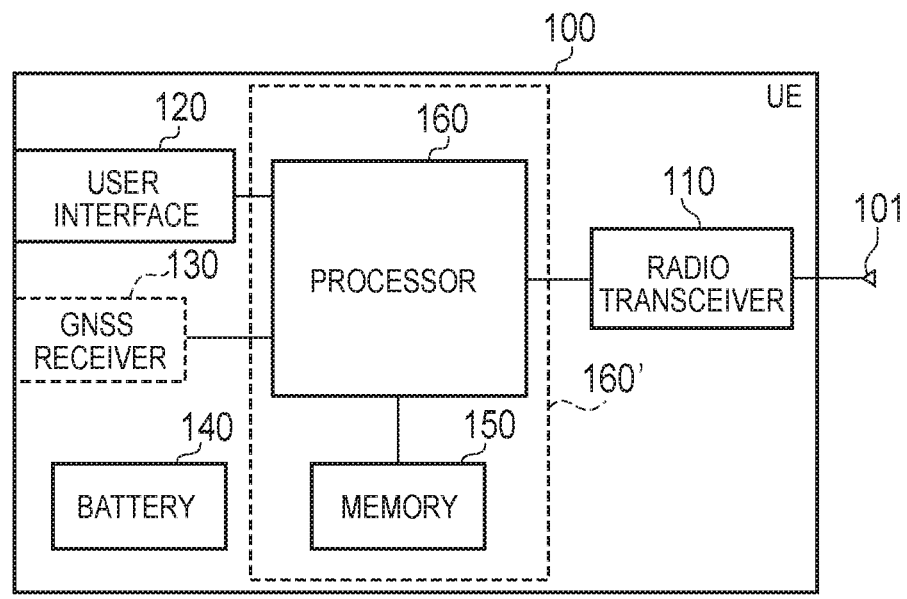
FIG. 2 is a block diagram illustrating a UE according to an embodiment.

FIG. 2 is a block diagram of the UE 100. As illustrated in FIG. 2, the UE 100 includes plural antennas 101, a radio transceiver 110, a user interface 120, a GNSS (Global Navigation Satellite System) receiver 130, a battery 140, a memory 150, and a processor 160. The memory 150 and the processor 160 constitute a controller. The UE 100 may not have the GNSS receiver 130. Furthermore, the memory 150 may be integrally formed with the processor 160, and this set (that is, a chip set) may be called a processor 160'.

The plural antennas 101 and the radio transceiver 110 are used to transmit and receive a radio signal. The radio transceiver 110 converts a baseband signal (a transmission signal) output from the processor 160 into the radio signal and transmits the radio signal from the antenna 101. Furthermore, the radio transceiver 110 converts a radio signal received by the antenna 101 into a baseband signal (a received signal), and outputs the baseband signal to the processor 160.

The user interface 120 is an interface with a user carrying the UE 100, and includes, for example, a display, a microphone, a speaker, various buttons and the like. The user interface 120 accepts an operation from a user and outputs a signal indicating the content of the operation to the processor 160. The GNSS receiver 130 receives a GNSS signal in order to obtain location information indicating a geographical location of the UE 100, and outputs the received signal to the processor 160. The battery 140 accumulates power to be supplied to each block of the UE 100.

The memory 150 stores a program to be executed by the processor 160 and information to be used for a process by the processor 160. The processor 160 includes a baseband processor that performs modulation and demodulation, encoding and decoding and the like on the baseband signal, and CPU (Central Processing Unit) that performs various processes by executing the program stored in the memory 150. The processor 160 may further include a codec that performs encoding and decoding on sound and video signals. The processor 160 executes various processes and various communication protocols described later.

Figure 3:
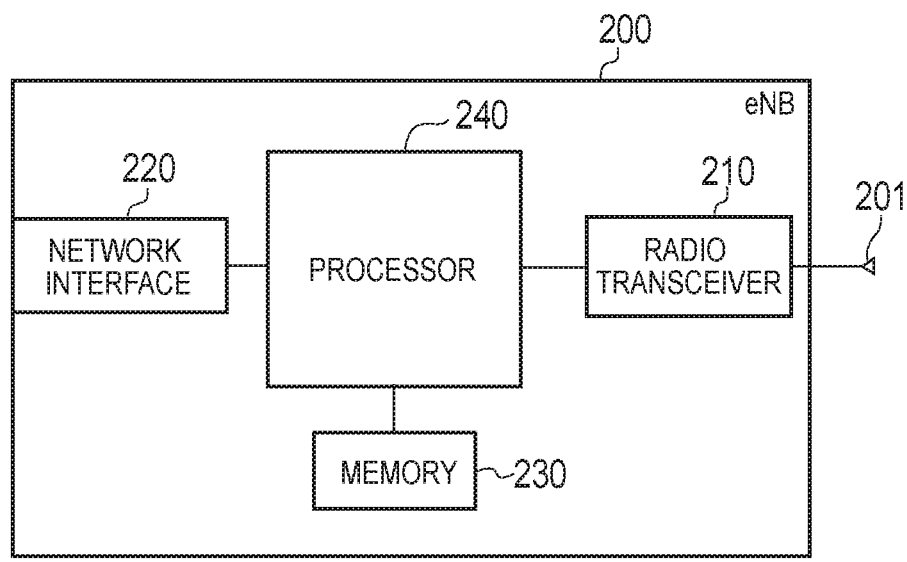
FIG. 3 is a block diagram illustrating an eNB according to an embodiment.

FIG. 3 is a block diagram of the eNB 200. As illustrated in FIG. 3, the eNB 200 includes plural antennas 201, a radio transceiver 210, a network interface 220, a memory 230, and a processor 240. The memory 230 and the processor 240 constitute a controller.

The plural antennas 201 and the radio transceiver 210 are used to transmit and receive a radio signal. The radio transceiver 210 converts a baseband signal (a transmission signal) output from the processor 240 into the radio signal and transmits the radio signal from the antenna 201. Furthermore, the radio transceiver 210 converts a radio signal received by the antenna 201 into a baseband signal (a received signal), and outputs the baseband signal to the processor 240.

The network interface 220 is connected to the neighboring eNB 200 via the X2 interface and is connected to the MME/S-GW 300 via the S1 interface. The network interface 220 is used in communication over the X2 interface and communication over the S1 interface.

The memory 230 stores a program to be executed by the processor 240 and information to be used for a process by the processor 240. The processor 240 includes a baseband processor that performs modulation and demodulation, encoding and decoding and the like on the baseband signal and CPU that performs various processes by executing the program stored in the memory 230. The processor 240 executes various processes and various communication protocols described later.

Figure 4:
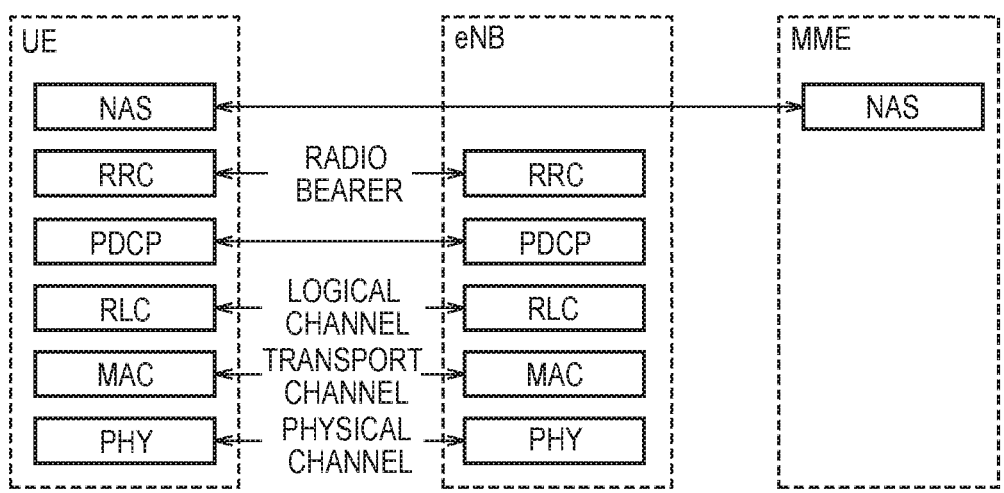
FIG. 4 is a protocol stack diagram illustrating a radio interface according to an embodiment.

FIG. 4 is a protocol stack diagram of a radio interface in the LTE system. As illustrated in FIG. 4, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, use data and control signal are transmitted via the physical channel.

The MAC layer performs priority control of data, a retransmission process by hybrid ARQ (HARQ), and the like. Between the MAC layer of the UE 100 and the MAC layer of the eNB 200, user data and control signal are transmitted via a transport channel. The MAC layer of the eNB 200 includes a scheduler that determines a transport format of an uplink and a downlink (a transport block size and a modulation and coding scheme) and a resource block to be assigned to the UE 100.

The RLC layer transmits data to an RLC layer of a reception side by using the functions of the MAC layer and the PHY layer. Between the RLC layer of the UE 100 and the RLC layer of the eNB 200, user data and control signal are transmitted via a logical channel.

The PDCP layer performs header compression and decompression, and encryption and decryption.

The RRC layer is defined only in a control plane dealing with control signal. Between the RRC layer of the UE 100 and the RRC layer of the eNB 200, control message (RRC messages) for various types of configuration are transmitted. The RRC layer controls the logical channel, the transport channel, and the physical channel in response to establishment, re-establishment, and release of a radio bearer. When there is an RRC connection between the RRC of the UE 100 and the RRC of the eNB 200, the UE 100 is in a connected state (an RRC connected state), otherwise the UE 100 is in an idle state (an RRC idle state).

A NAS (Non-Access Stratum) layer positioned above the RRC layer performs a session management, a mobility management and the like.

Figure 5:
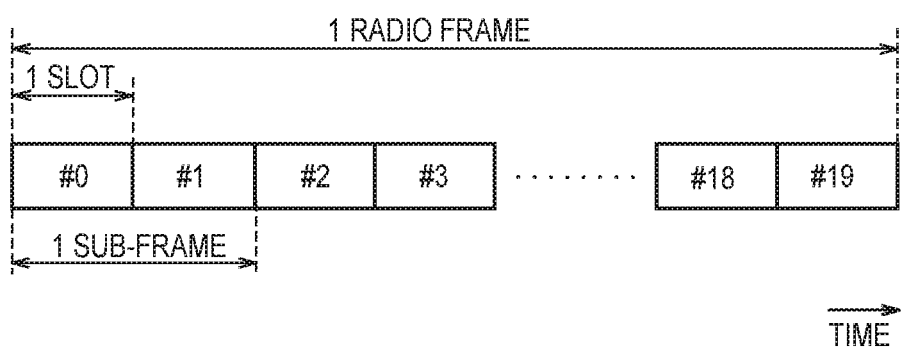
FIG. 5 is a configuration diagram illustrating a radio frame according to an embodiment.

FIG. 5 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As illustrated in FIG. 5, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. The resource block includes a plurality of subcarriers in the frequency direction. One subcarrier and one symbol constitute one resource element.

Among radio resources assigned to the UE 100, a frequency resource can be specified by a resource block and a time resource can be specified by a subframe (or slot).

In the downlink (DL), an interval of several symbols at the head of each subframe is a control region used as a physical downlink control channel (PDCCH) for mainly transmitting a control signal. Furthermore, the other interval of each subframe is a region available as a physical downlink shared channel (PDSCH) for mainly transmitting user data.

In the uplink (UL), both ends in the frequency direction of each subframe are control regions used as a physical uplink control channel (PUCCH) for mainly transmitting a control signal. Furthermore, the other portion of each subframe is a region available as a physical uplink shared channel (PUSCH) for mainly transmitting user data.

(D2D Communication)

The LTE system according to an embodiment supports the D2D communication that is direct inter-terminal communication (inter-UE communication). Here, the description will proceed with a comparison between the D2D communication and cellular communication that is normal communication of the LTE system. The cellular communication is a communication mode in which a data path passes through a network (the E-UTRAN 10 and the EPC 20). The data path refers to a communication path of user data. On the other hand, the D2D communication is a communication mode in which a data path set between the UEs does not pass through a network.

Figure 6:
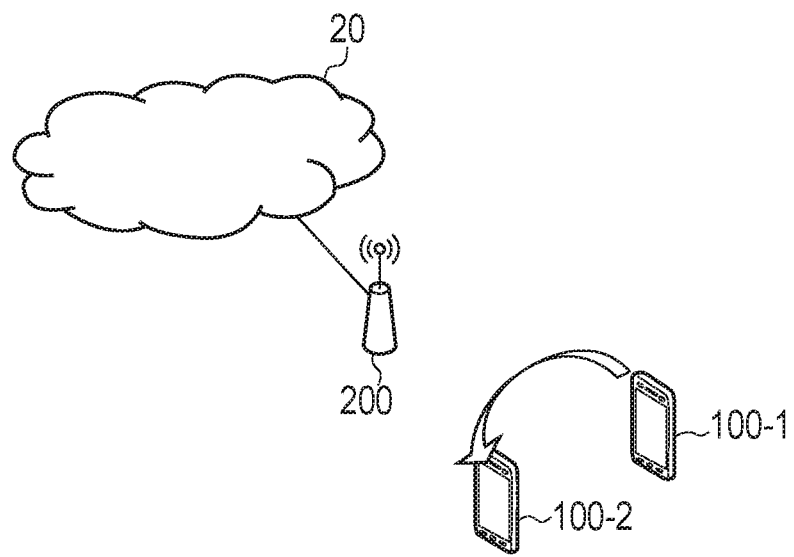
FIG. 6 is a diagram illustrating D2D communication according to an embodiment.

FIG. 6 is a diagram illustrating the D2D communication. In the D2D communication, the data path does not pass through the eNB 200 as illustrated in FIG. 6. The UE 100-1 and the UE 100-2 that are close to each other directly perform radio communication at low transmission power in the cell of the eNB 200. As described above, as the UE 100-1 and the UE 100-2 that are close to each other directly perform radio communication at low transmission power, it is possible to reduce the power consumption of the UE 100 to be smaller than in the cellular communication and reduce interference to a neighboring cell.

Operation According to Embodiment

Next, an operation according to an embodiment will be described.

(1) Overview of Operation

The UE 100 transmits or receives the discovery signal used for discovering the nearby UE 100 in order to perform the D2D communication. After the discovery process, the UE 100 performs the D2D communication with the nearby UE 100.

Thus, in the mobile communication system that supports the D2D communication, it is necessary to secure radio resources (the discovery resources) used for transmission and reception of the discovery signal, separately from radio resources (the D2D communication resources) used for transmission and reception of at least user data in the D2D communication. However, when the discovery resources are secured, it is possible to increase a probability that the nearby UE 100 will be discovered successfully, but since the D2D communication resources or the cellular communication resources are relatively reduced, the system throughput decreases.

In an embodiment, the eNB 200 sets the discovery resources serving as the radio resources used for transmission and reception of the discovery signal in order to perform the D2D communication. For example, the eNB 200 sets the D2D communication resources and the discovery resources in the radio resources secured for the D2D communication in a time division manner. Alternatively, the eNB 200 may set the D2D communication resources and the discovery resources in a frequency division manner. The following description will proceed with an example in which the D2D communication resources and the discovery resources are set in the time division manner.

The eNB 200 controls a discovery resource quantity (duration) based on information on the UE 100 existing in a target area serving as a discovery resource setting target area. For example, the target area is a cell. However, the target area may be a tracking area. Alternatively, instead of controlling the discovery resource quantity for each area, the discovery resource quantity may be controlled for each UE 100. Further, "exist" does not depend on whether the UE 100 is in an idle state (an RRC idle state) or a connected state (an RRC connected state).

As the eNB 200 controls the discovery resource quantity based on the information on the UE 100 existing in the target area as described above, it is possible to adaptively set the discovery resource quantity according to a state of the UE 100 existing in the target area. Thus, the discovery resources can appropriately be set.

An operation of controlling the discovery resource quantity includes first to seventh operation patterns described below. The first to seventh operation patterns will be described in detail later, but an overview of each operation pattern is described here. The first to seventh operation patterns need not be necessarily independently performed and two or more patterns are combined and performed.

In the first operation pattern, the eNB 200 controls the discovery resource quantity based on information indicating the number of UEs 100 existing in the target area. In the second operation pattern, the eNB 200 controls the discovery resource quantity based on information indicating transmission power of the discovery signal in the UE 100 existing in the target area. In the third operation pattern, the eNB 200 controls the discovery resource quantity based on information indicating the density of the UEs 100 existing in the target area. In the fourth operation pattern, the eNB 200 controls the discovery resource quantity based on information on a result of the discovery process using the discovery signal in the UE 100 existing in the target area. In the fifth operation pattern, the eNB 200 controls the discovery resource quantity based on information indicating the size of the cell in which the UE 100 exists. In the sixth operation pattern, the eNB 200 controls the discovery resource quantity based on the information indicating the attribute of the UE 100 existing in the target area. In the seventh operation pattern, the eNB 200 controls the discovery resource quantity based on the information indicating the frequency band used for transmission and reception of the discovery signal by the UE 100 existing in the target area.

(2) Format of Discovery Resources

Figure 7:
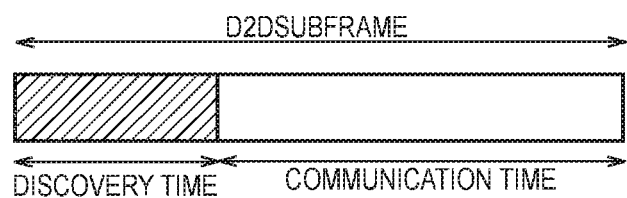
FIG. 7 is a diagram illustrating a format of discovery resources according to an embodiment.

FIG. 7 is a diagram illustrating a format of the discovery resources according to an embodiment.

As illustrated in FIG. 7, in a subframe secured for the D2D communication, the D2D communication resources and the discovery resources are set in the time division manner. The D2D communication resources are the radio resources used for transmission and reception of user data (and a control signal) in the D2D communication. The discovery resources are the radio resources used for transmission and reception of the discovery signal. For example, code division multiplexing using an orthogonal code is applied to the discovery resources.

In an example of FIG. 7, an interval of several symbols from the head corresponds to the discovery resources, and the remaining interval corresponds to the D2D communication resources. Hereinafter, the interval corresponding to the discovery resources is referred to as a "discovery time," and the interval corresponding to the D2D communication resources is referred to as a "D2D communication time (communication time)." A duration obtained by adding the discovery time and the D2D communication time is a predetermined duration (a subframe length in the example of FIG. 7). Thus, when the discovery time is increased, the D2D communication time is relatively decreased, and the D2D communication capacity (the throughput of the D2D communication) decreases. On the other hand, when the discovery time is decreased, the D2D communication time is relatively increased, the D2D communication capacity (the throughput of the D2D communication) is improved.

In the example of FIG. 7, the discovery resources and the D2D communication resources can be set in units of symbols within the subframe in the time division manner, but the present disclosure is not limited thereto, and the discovery resources and the D2D communication resources may be set in units of subframes within the radio frame in the time division manner.

In order to transmit and receive the discovery signal, the UE 100 are allocated the discovery resources (time and frequency resources) and an orthogonal code from the eNB 200. The UE 100 transmits and receives the discovery signal using the discovery resources and the orthogonal code allocated from the eNB 200.

(3) First Operation Pattern

In the first operation pattern, the eNB 200 controls the discovery time based on the information indicating the number of UEs 100 existing in the target area.

For example, the information indicating the number of UEs 100 include the number of UEs 100 in the connected state in its own cell or the number of UEs 100 in the idle state in the tracking area including its own cell. The eNB 200 can acquire the number of UEs 100 in the idle state from the MME 300. The number of UEs 100 may be limited to the number of UEs 100 that support the D2D communication. In this case, the eNB 200 acquires information indicating whether or not the D2D communication is supported from the UE 100.

Figure 8A:
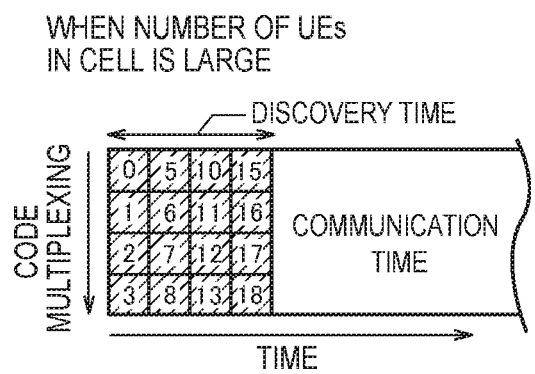
FIGS. 8A and 8B are diagrams illustrating a first operation pattern according to an embodiment.
Figure 8B:
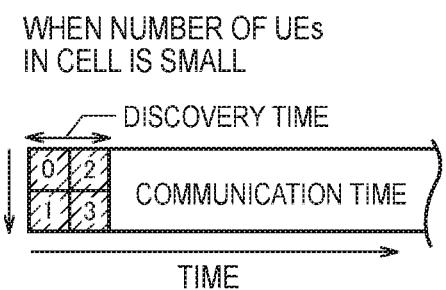

FIGS. 8A and 8B are diagrams illustrating the first operation pattern. As illustrated in FIGS. 8A and 8B, when the number of UEs 100 is large, the eNB 200 increases the discovery time and decreases the discovery time when the number of UEs 100 is small. By controlling the discovery time according to the number of UEs 100, it is possible to set the discovery resource quantity suitable for the number of UEs 100.

Specifically, when the code length of the orthogonal code applied in the discovery time is variable, both the discovery time and the code length are increased. By increasing the code length, it is possible to increase the number of available orthogonal codes, and thus it is possible to allocate the orthogonal code for the discovery signal to the more UEs 100.

On the other hand, when the code length of the orthogonal code applied in the discovery time is fixed, the number of available orthogonal codes is fixed, and thus the number of UEs accommodatable in the discovery time is increased by increasing the discovery time. By increasing the discovery time to be n times a duration (a unit duration) corresponding to one orthogonal code, it is possible to increase the number of UEs accommodatable in the discovery time by n times.

Further, when the number of UEs 100 is small, both the discovery time may be decreased (the D2D communication time may be increased), and the frequency resources in the discovery time may be decreased as well. For example, when the number of UEs 100 is small, some resource blocks rather than all resource blocks in the subframe secured for the D2D communication are used as the discovery resources and the D2D communication resources.

Figure 9:
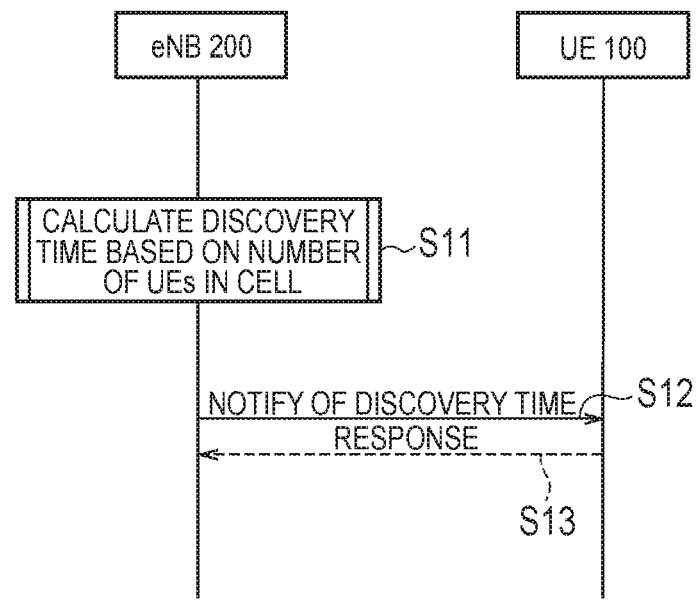
FIG. 9 is a sequence diagram of the first operation pattern according to an embodiment.

FIG. 9 is a sequence diagram illustrating the first operation pattern. As illustrated in FIG. 9, in step S11, the eNB 200 calculates the discovery time based on the number of UEs 100 in its own cell. A discovery time calculation flow will be described later. In step S12, the eNB 200 notifies the UE 100 in its own cell of the calculated discovery time in a unicast or broadcast manner. The UE 100 may transmit a response to the notified discovery time to the eNB 200 (step S13).

Figure 10:
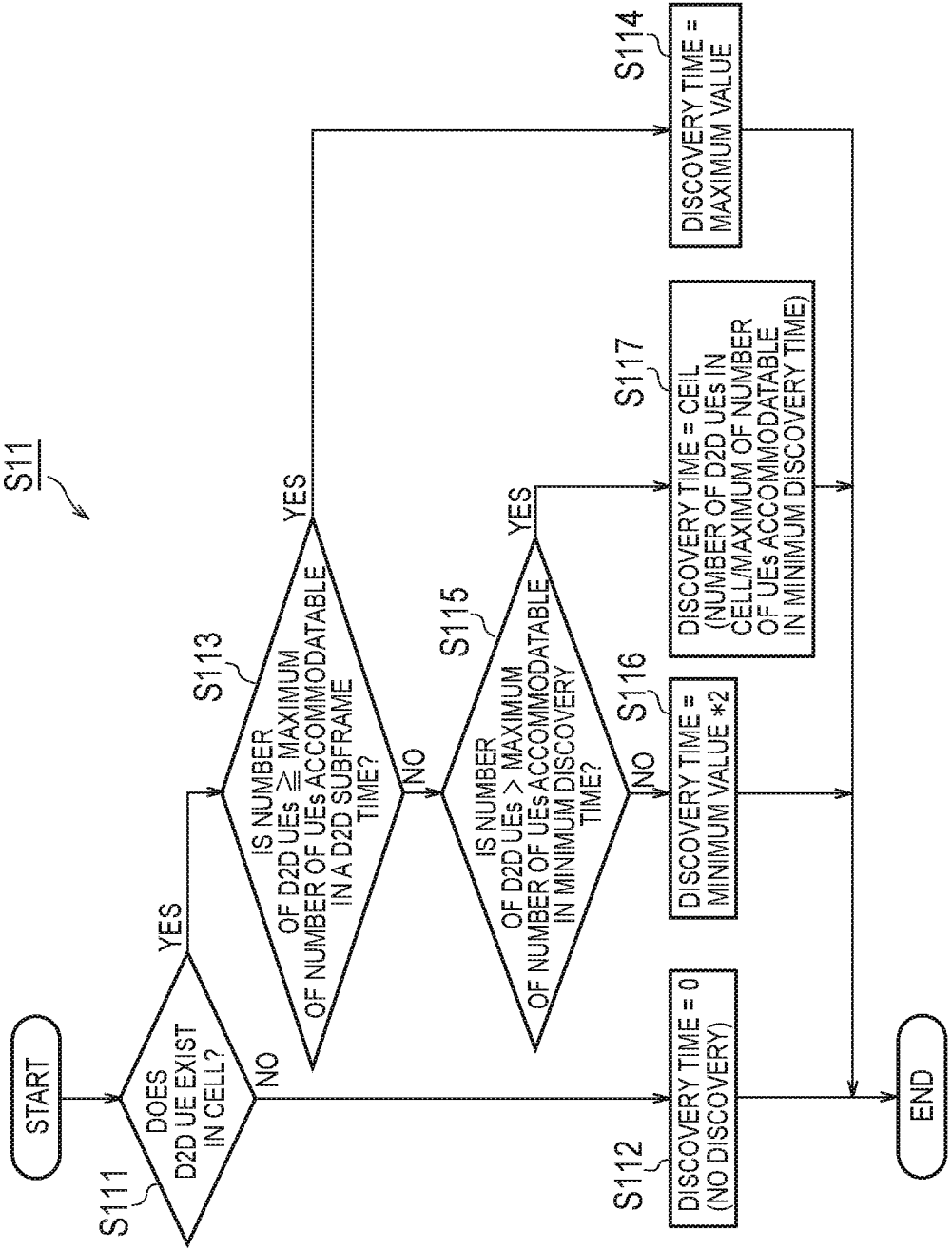
FIG. 10 is a flowchart illustrating a flow of calculating a discovery time in the first operation pattern according to an embodiment.

FIG. 10 is a flowchart illustrating the discovery time calculation flow in the first operation pattern. As illustrated in FIG. 10, in step S111, the eNB 200 determines whether or not the UE 100 exists in its own cell. When a determination result in step S111 is "NO," in step S112, the eNB 200 sets the discovery time to zero. When a determination result in step S111 is "Yes," in step S113, the eNB 200 determines whether or not the number of UEs 100 in its own cell is equal to or more than a maximum of the number of UEs accommodatable in the discovery time. When a determination result in step S113 is "YES," in step S114, the eNB 200 sets the discovery time to a maximum value. When a determination result in step S113 is "NO," in step S115, the eNB 200 determines whether or not the number of UEs 100 in its own cell exceeds a maximum of the number of UEs to which code division multiplexing can be applied. When a determination result in step S115 is "YES," in step S117, the eNB 200 sets a value (a decimal is rounded up) obtained by dividing the number of UEs 100 in its own cell by a maximum of the number of UEs accommodatable in a minimum discovery time as the discovery time. When a determination result in step S115 is "NO," in step S116, the eNB 200 sets a value that is twice the minimum discovery time as the discovery time.

(4) Second Operation Pattern

In the second operation pattern, the eNB 200 controls the discovery resource quantity based on the information indicating the transmission power of the discovery signal in the UE 100 existing in the target area.

When the transmission power of the discovery signal is managed by the eNB 200, the eNB 200 can use information of the managed transmission power of the discovery signal. When the transmission power of the discovery signal is decided by the UE 100, the eNB 200 acquire the information indicating the transmission power of the discovery signal from the UE 100 and use the acquired information. The information indicating the transmission power of the discovery signal may be a statistic (an average value, a maximum value, a minimum value, a mode value, or the like) of the transmission power of the discovery signal in the UE 100 in its own cell.

FIGS. 11A and 11B are diagrams illustrating the second operation pattern. As illustrated in FIGS. 11A and 11B, the eNB 200 increases the discovery time when the transmission power of the discovery signal is low but decreases the discovery time when the transmission power of the discovery signal is high. As the transmission power of the discovery signal decreases, an arrival range of the discovery signal decreases, and thus a probability that the discovery process will be performed successfully decreases. On the other hand, as the discovery time increases, the probability that the discovery process will be performed successfully increases. Thus, when the transmission power of the discovery signal is low, the probability that the discovery process will be performed successfully can be maintained at a certain level by increasing the discovery time.

A sequence of notifying the UE 100 of the discovery time decided by the eNB 200 is similar to that in the first operation pattern.

(5) Third Operation Pattern

An example of the third operation pattern will now be described with reference to FIGS. 12, 13 and 17. In the third operation pattern, the eNB 200 controls the discovery resource quantity based on the information indicating the density of the UEs 100 existing in the target area. For example, the information indicating the density of the UEs 100 is an inter-UE path loss or an inter-UE distance based on UE position information. For instance, in step S301 in FIG. 17, each UE 100 transmits a reference signal of known transmission power, and thus a difference between reception power and transmission power when the reference signal is received in each UE 100 may be acquired from each UE 100 as the inter-UE path loss. Further, the eNB 200 may use GNSS position information acquired from the UE 100 as the UE position information.

The eNB 200 increases the discovery time when the density of the UEs 100 in its own cell is low and decreases the discovery time when the density of the UEs 100 in its own cell is high. As the density of the UEs 100 decreases, the probability that the discovery process will be performed successfully decreases. On the other hand, as the discovery time increases, the probability that the discovery process will be performed successfully increases. Thus, when the density of the UEs 100 is low, the probability that the discovery process will be performed successfully can be maintained at a certain level by increasing the discovery time. Alternatively, in order to discover all UEs within a certain range, the discovery time may be increased when the density of the UEs 100 in its own cell is high, and the discovery time may be decreased when the density of the UEs 100 in its own cell is low.

FIG. 12 is a sequence diagram illustrating the third operation pattern. Here, an example in which the discovery time is set for each UE 100 based on the inter-UE path loss will be described. As illustrated in FIG. 12, in step S21, the eNB 200 requests the UE 100 in its own cell (the UEs 100-1 to 100-3) to transmit the inter-UE path loss. In step S22, each of the UEs 100-1 to 100-3 transmits a list of inter-UE path losses to the eNB 200. In step S23 (also step S302 in FIG. 17), the eNB 200 decides the discovery time based on the list of the inter-UE path losses for each of the UEs 100-1 to 100-3. A discovery time decision flow will be described later. In step S24 (also step S303 in FIG. 17), the eNB 200 notifies the UEs 100-1 to 100-3 of the decided discovery time in the unicast manner, which is thus received by the UEs 100-1 to 100-3 (step S304 in FIG. 17). The UEs 100-1 to 100-3 may transmit a response to the notified discovery time to the eNB 200, and can thus use the discovery resource (step S305 in FIG. 17).

FIG. 13 is a flowchart illustrating the discovery time calculation flow in the third operation pattern. As illustrated in FIG. 13, a process of steps S231 to S234 is performed by each of the UEs 100. In step S231, the eNB 200 determines whether or not the number of UEs that can be discovered in the minimum discovery time is equal to or more than a minimum of the number of discoverable UEs based on the list of the inter-UE path losses acquired from the target UE 100. For example, when a value (that is, estimated reception power of the discovery signal) obtained by subtracting the inter-UE path loss from the transmission power of the discovery signal is equal to or more than a threshold value, it can be determined that it is possible to discover the neighboring UE 100 corresponding to the inter-UE path loss. When a determination result in step S231 is "NO," a loop for deciding the discovery time starts, and when the discovery time is less than the maximum discovery time (NO in step S232), the unit discovery time is added to the discovery time (step S233). When the number of UEs that can be discovered in the discovery time is equal to or more than a minimum of the number of discoverable UEs, the process gets out of the loop, and the discovery time is stored (step S234).

(6) Fourth Operation Pattern

In the fourth operation pattern, the eNB 200 controls the discovery resource quantity based on the information on the result of the discovery process using the discovery signal in the UE 100 existing in the target area. For example, a result of the discovery process is reported from the UE 100 to the eNB 200, and thus the eNB 200 can use information on the result of the discovery process.

Figure 14A:
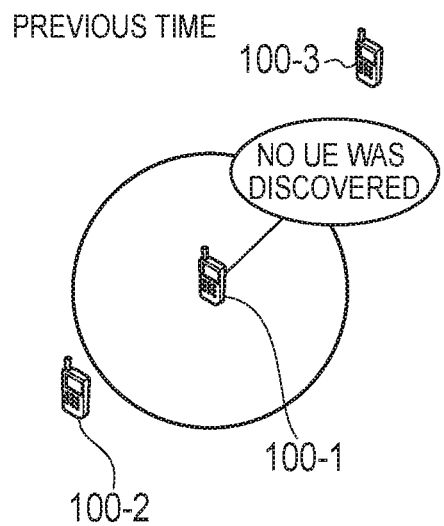
FIGS. 14A and 14B are diagrams illustrating a fourth operation pattern according to an embodiment.
Figure 14B:
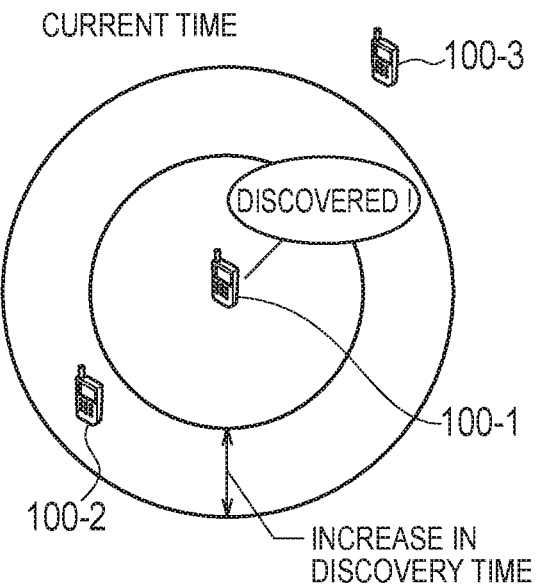

FIGS. 14A and 14B are diagrams illustrating the fourth operation pattern. As illustrated in FIGS. 14A and 14B, the eNB 200 increases the current discovery time when the UE 100 has discovered no nearby UE in a previous discovery process, and decreases the current discovery time when the UE 100 has discovered a nearby UE in the previous discovery process. Alternatively, a target value of the number of nearby UEs discovered in the discovery process may be set, and the discovery time may be adjusted to become the target value. For example, a method of increasing the discovery time until it reaches a minimum of the number of discoverable UEs and decreasing the discovery time until it falls below a maximum of the number of discoverable UEs may be employed.

(7) Fifth Operation Pattern

In the fifth operation pattern, the eNB 200 controls the discovery resource quantity based on the information indicating the size of the cell in which the UE 100 exists. The information indicating the size of the cell may be a cell type (a macro cell, a pico cell, a femto cell) or may be information indicating a radius, a diameter, or transmission power of the cell.

For example, as the size of its own cell increases, the eNB 200 increases the discovery time so that the arrival range of the discovery time is increased. As the size of its own cell decreases, the eNB 200 decreases the discovery time so that the arrival range of the discovery time is decreased.

(8) Sixth Operation Pattern

In the sixth operation pattern, the eNB 200 controls the discovery resource quantity based on the information indicating the attribute of the UE 100 existing in the target area.

The attribute of the UE 100 refers to a contract condition (for example, a contract in which "the UE can be discovered at a distance of up to 10 m or 20 m" or "up to 10 UEs or 20 UEs can be discovered."). Alternatively, the attribute of the UE 100 may be a type of the UE 100 (for example, a public safety UE or a common UE). The eNB 200 may acquire the information indicating the attribute of the UE 100 from the UE 100 and use the acquired information.

For example, for the UE 100 having a contract condition related to the discovery process, the eNB 200 adjusts the discovery time so that the contract condition is satisfied. Further, for the public safety UE, the eNB 200 increases the discovery time to be higher in a success rate of the discovery process than for the common UE. Specifically, a required arrival range of the discovery signal differs according to a type of UE. Further, when the discovery signals to which the orthogonal codes of the different code lengths are applied are used together in the same cell without dividing resources, interference occurs. In order to avoid it, the code length of the orthogonal code applied to the discovery signal is set to the same length, the discovery time is increased, and the number of repetitions in repetitive transmission of the discovery signal is changed according to a type of UE. Further, a reception duration of the discovery time is decided according to a type of UE. Accordingly, the discovery range required for each UE can be implemented.

(9) Seventh Operation Pattern

In the seventh operation pattern, the eNB 200 controls the discovery resource quantity based on the information indicating the frequency band used for transmission and reception of the discovery signal by the UE 100 existing in the target area.

When the frequency band used for transmission and reception of the discovery signal is specified in the same way, the eNB 200 can use information indicating the specified frequency bands. When the frequency band used for transmission and reception of the discovery signal are set for each UE 100, the UE 100 reports the frequency band used for transmission and reception of the discovery signal to the eNB 200, and the eNB 200 can use the information indicating the frequency band used for transmission and reception of the discovery signal by the UE 100.

Generally, as the frequency band is low, a radio wave is successfully propagated, and thus the eNB 200 decreases the discovery time when the frequency band used for transmission and reception of the discovery signal is low. On the other hand, the eNB 200 increases the discovery time when the frequency band used for transmission and reception of the discovery signal is high.

Conclusion of Embodiment

As described above, the eNB 200 controls the discovery time based on the information on the UE 100 existing in the target area. As a result, the discovery time can adaptively be set according to the state of the UE 100 existing in the target area. Thus, the discovery time can appropriately be set.

Other Embodiments

In the above embodiment, the eNB 200 has been described as an example of the network apparatus according to the present disclosure, but the network apparatus according to the present disclosure is not limited to the eNB 200 and may be a higher-level device (the MME 300, the OAM, or the like) of the eNB 200.

Figure 15:
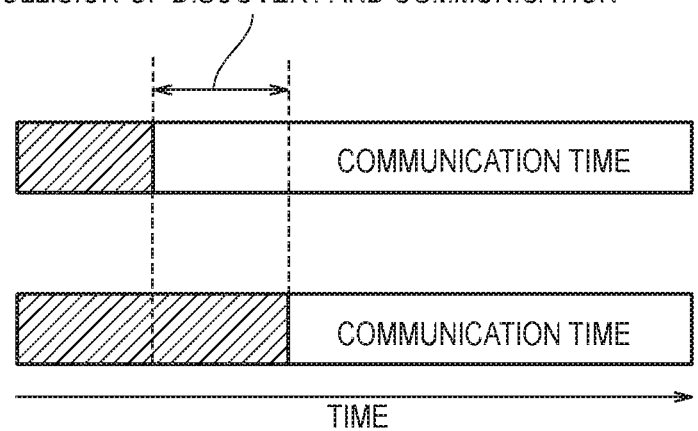
FIG. 15 is a diagram illustrating an interference between UEs that differ in a setting of a discovery time.

In the above embodiment, the discovery time has been described as being set in units of tracking areas, units of cells, or units of UEs, but when a plurality of UEs 100 that differ in a setting of the discovery time get closer to each other, an interference problem is likely to occur. FIG. 15 is a diagram illustrating interference between UEs that differ in a setting of the discovery time. As illustrated in FIG. 15, the discovery time for the UE to which the long discovery time is set overlaps (collides with) a portion of the D2D communication time in another UE to which the short discovery time is set. At a reception side, it is difficult to decode the overlapping portion. Thus, the eNB 200 (or the UE 100) that has detected interference caused by the overlapping may employ any one of the following interference avoidance methods. A first method is a method of changing transmission power of UEs that interfere with each other. In this case, a priority may be given to the discovery signal (the discovery time), or a priority may be given to the user data (the D2D communication time). A second method is a method of shifting transmission timings or use frequencies of UEs that interfere with each other. A third method is a method of increasing the number of repetitive transmissions of the discovery time in order to give interference resistance to the discovery signal (the discovery time).

Figure 16:
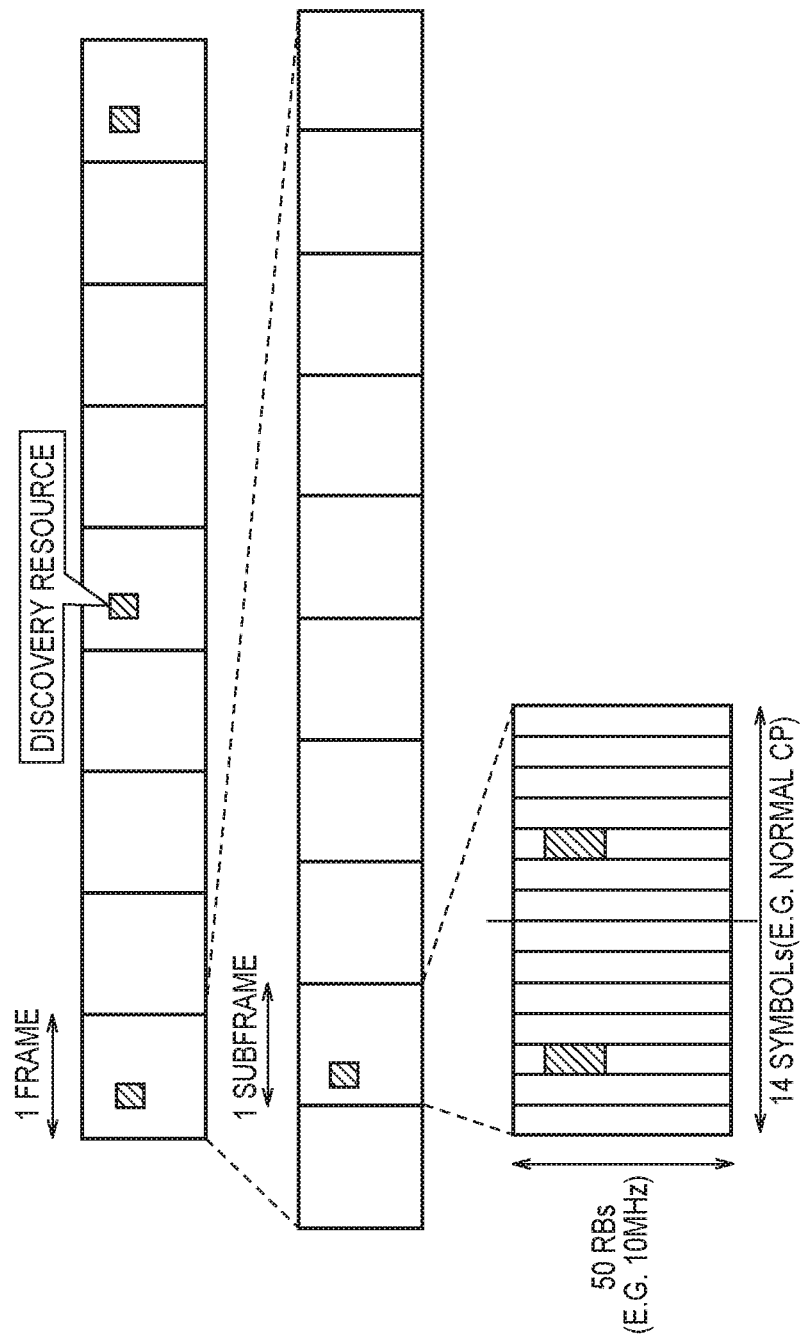
FIG. 16 is a diagram illustrating another format of discovery resources.

In the above embodiment, the example of controlling the discovery resource quantity by increasing or decreasing the discovery time has been described. However, the adjustment may be performed in the frequency direction rather than the time direction. Further, the discovery resources may be adjusted in both the time direction and the frequency direction. FIG. 16 is a diagram illustrating another format of the discovery resources. As illustrated in FIG. 16, the discovery resources are set to a specific resource block in a specific communication frequency band in the frequency direction. Further, the discovery resources are set to a specific symbol in a specific subframe in the time direction.

In the above embodiments, the LTE system has been described as an example of the cellular communication system, but the cellular communication system is not limited to the LTE system, and the present disclosure may be applied to a system other than the LTE system.

INDUSTRIAL APPLICABILITY

The present disclosure is useful in mobile communication fields.

The invention claimed is:

1. A method for a mobile communication system that supports a device-to-device (D2D) communication that is direct inter-terminal communication, comprising:
    transmitting location information indicating a geographical location of a user terminal located in a cell of a base station, from the user terminal to the base station;
    allocating, at the base station, radio resources to the user terminal based on the location information, wherein the radio resources are used by the user terminal to transmit a signal for the D2D communication;
    notifying the allocated radio resources to the user terminal by a unicast manner;
    receiving, at the user terminal, a unicast signal indicating the radio resources allocated by using the location information, from the base station; and
    using the allocated radio resources to transmit the signal for the D2D communication.

2. A base station for a mobile communication system that supports a device-to-device (D2D) communication that is direct inter-terminal communication, comprising:
    a controller configured to:
        acquire location information indicating geographical location of a user terminal located in a cell of the base station, from the user terminal,
        allocate radio resources to the user terminal based on the location information, wherein the radio resources are used by the user terminal to transmit a signal for the D2D communication, and
        notify the allocated radio resources to the user terminal by a unicast manner.

3. A user terminal for a mobile communication system that supports a device-to-device (D2D) communication that is direct inter-terminal communication, comprising:
    a controller configured to:
        transmit location information indicating a geographical location of the user terminal located in a cell of a base station, to the base station,
        receive a unicast signal indicating radio resources allocated by using the location information, from the base station, the unicast signal being specific to the user terminal and different from another unicast signal transmitted to another user equipment, and
        use the allocated radio resources to transmit a signal for the D2D communication.

* * * * *